(12) United States Patent
Chiu

(10) Patent No.: US 11,809,640 B2
(45) Date of Patent: Nov. 7, 2023

(54) METHOD FOR DETECTING MOVEMENT OF RING CONTROLLER, RING CONTROLLER, AND COMPUTER READABLE MEDIUM

(71) Applicant: HTC Corporation, Taoyuan (TW)

(72) Inventor: Wei-Cheng Chiu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/547,210

(22) Filed: Dec. 9, 2021

(65) Prior Publication Data

US 2023/0185384 A1 Jun. 15, 2023

(51) Int. Cl.
*G06F 3/0346* (2013.01)
*G06F 3/01* (2006.01)

(52) U.S. Cl.
CPC ............ *G06F 3/0346* (2013.01); *G06F 3/011* (2013.01); *G06F 2203/0331* (2013.01)

(58) Field of Classification Search
CPC . G06F 3/0346; G06F 3/011; G06F 2203/0331
See application file for complete search history.

(56) References Cited

U.S. PATENT DOCUMENTS

| 2011/0007035 A1* | 1/2011 | Shai | ..................... G06F 3/0338 345/179 |
| 2021/0096657 A1* | 4/2021 | D'Amone | ............... G06F 3/014 |

\* cited by examiner

*Primary Examiner* — Jonathan A Boyd
(74) *Attorney, Agent, or Firm* — JCIPRNET

(57) ABSTRACT

The embodiments of the disclosure provide a method for detecting a movement of a ring controller, a ring controller, and a computer readable medium. The method includes: obtaining a plurality of moving parameters of the movement of the ring controller, wherein the ring controller is used to interact with a user interface; determining a rotating condition of the ring controller based on the moving parameters; and adjusting a visual content provided in the user interface based on the rotating condition of the ring controller.

12 Claims, 8 Drawing Sheets

METHOD FOR DETECTING MOVEMENT OF RING CONTROLLER, RING CONTROLLER, AND COMPUTER READABLE MEDIUM

BACKGROUND

1. Field of the Invention

The present disclosure generally relates to a motion detection mechanism, in particular, to a method for detecting a movement of a ring controller, a ring controller, and a computer readable medium.

2. Description of Related Art

A smart ring is a ring-shaped controller/device that can be worn on the user's finger for interacting with electronic devices. In general, the smart ring is paired with electronic devices (e.g., such as smart phones) and disposed with touch sensors and direction buttons for the user to control the user interface of the electronic devices.

However, when the smart ring is used to interact with 3D visual contents (e.g., virtual reality (VR) contents), the functions provided by the touch sensors and the direction buttons would not be enough for controlling the electronic devices.

SUMMARY OF THE INVENTION

Accordingly, the disclosure is directed to a method for detecting a movement of a ring controller, a ring controller, and a computer readable medium, which may be used to solve the above technical problems.

The embodiments of the disclosure provide a method for detecting a movement of a ring controller, adapted to a ring controller. The method includes: obtaining a plurality of moving parameters of the movement of the ring controller, wherein the ring controller is used to interact with a user interface; determining a rotating condition of the ring controller based on the moving parameters; and adjusting a visual content provided in the user interface based on the rotating condition of the ring controller.

The embodiments of the disclosure provide a ring controller including a motion detector and a processor. The motion detector obtains a plurality of moving parameters of a movement of the ring controller, wherein the ring controller is used to interact with a user interface. The processor is coupled to the motion detector and performs: determining a rotating condition of the ring controller based on the moving parameters; and adjusting a visual content provided in the user interface based on the rotating condition of the ring controller.

The embodiments of the disclosure provide a non-transitory computer readable medium, the computer readable medium recording an executable computer program, the executable computer program being loaded by a ring controller to perform steps of: obtaining a plurality of moving parameters of the movement of the ring controller, wherein the ring controller is used to interact with a user interface; determining a rotating condition of the ring controller based on the moving parameters; and adjusting a visual content provided in the user interface based on the rotating condition of the ring controller.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1B:
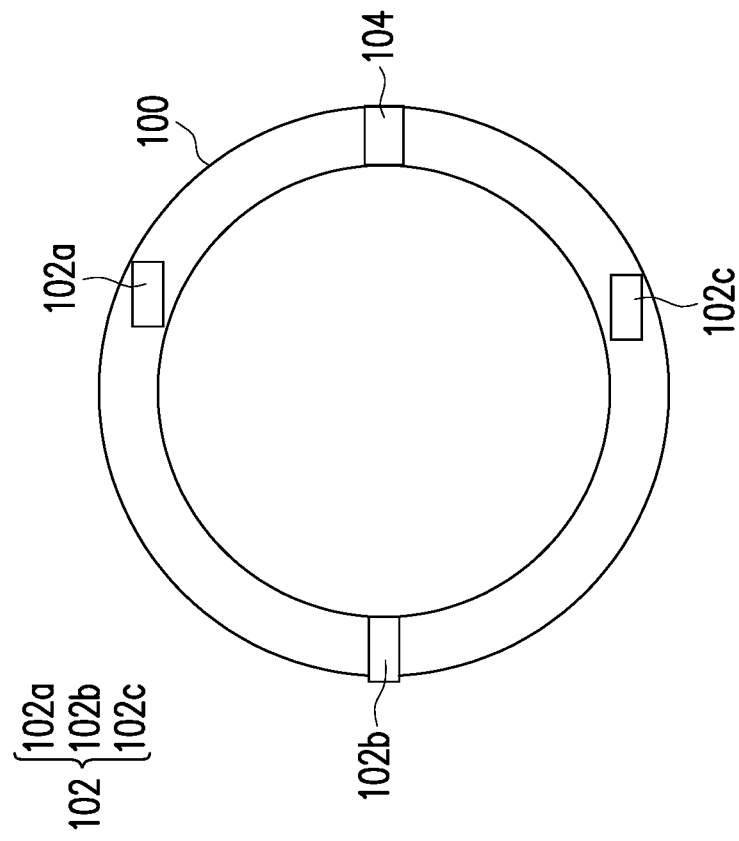
FIG. 1B is a schematic diagram of the ring controller according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

Figure 1A:
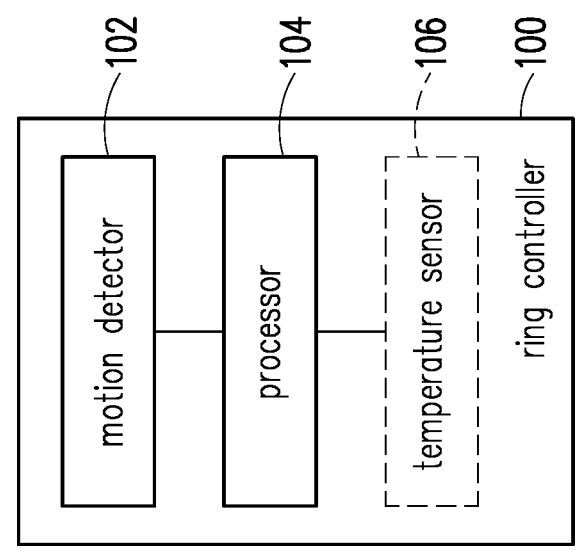
FIG. 1A is a functional block diagram of the ring controller according to an embodiment of the disclosure.

See FIG. 1A and FIG. 1B, wherein FIG. 1A is a functional block diagram of the ring controller according to an embodiment of the disclosure, and FIG. 1B is a schematic diagram of the ring controller according to an embodiment of the disclosure.

In FIG. 1A and FIG. 1B, the ring controller 100 includes a motion detector 102 and a processor 104. In the embodiments of the disclosure, the ring controller 100 can be a smart ring that can be worn on user's finger for the user the interact with visual contents. In various embodiments, the visual contents can be shown in the user interfaces provided by various electronic devices. In some embodiments, the electronic devices may be any smart device and/or computer. In other embodiments, the electronic devices may be hosts (e.g., a computer or a standalone head-mounted display) for providing virtual environments (e.g., VR environments) as the user interface.

In various embodiments, the motion detector 102 can be any device that provides moving parameters in response to the movement of the ring controller 100. In one embodiment, the motion detector 102 can include a plurality of inertial measurement units (IMU) 102a-102c, wherein each of the IMUs 102a-102c can include gyroscopes and accelerometers for providing corresponding measurements, such as accelerations, angular rates, etc. In other embodiments, the motion detector 102 can include more/less IMUs or other motion detecting elements, but the disclosure is not limited thereto.

The processor 104 is coupled with the motion detector 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 can access specific modules or program codes to implement the method for detecting the movement of the ring controller 100 provided in the disclosure, which would be further discussed in the following.

Figure 2:
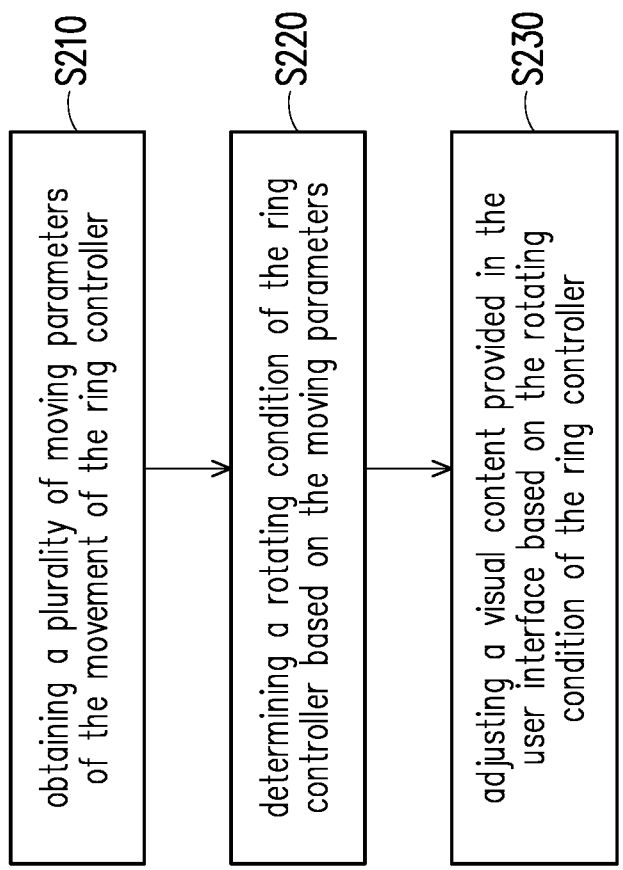
FIG. 2 shows a flow chart of the method for detecting the movement of the ring controller according to an embodiment of the disclosure.

See FIG. 2, which shows a flow chart of the method for detecting the movement of the ring controller according to an embodiment of the disclosure. The method of this embodiment may be executed by the ring controller 100 in FIG. 1A and FIG. 1B, and the details of each step in FIG. 2 will be described below with the components shown in FIG. 1A and FIG. 1B.

Firstly, in step S210, the motion detector 102 obtains a plurality of moving parameters of the movement of the ring controller 100. In one embodiment, if the motion detector 102 includes one IMU, the motion detector 102 may provide a multiaxial acceleration vector as the moving parameters. In another embodiment, if the motion detector 102 includes multiple IMUs (e.g., IMUs 102a-102c), the coordinate systems of each IMU can be mapped to the same coordinate system.

Figure 3:
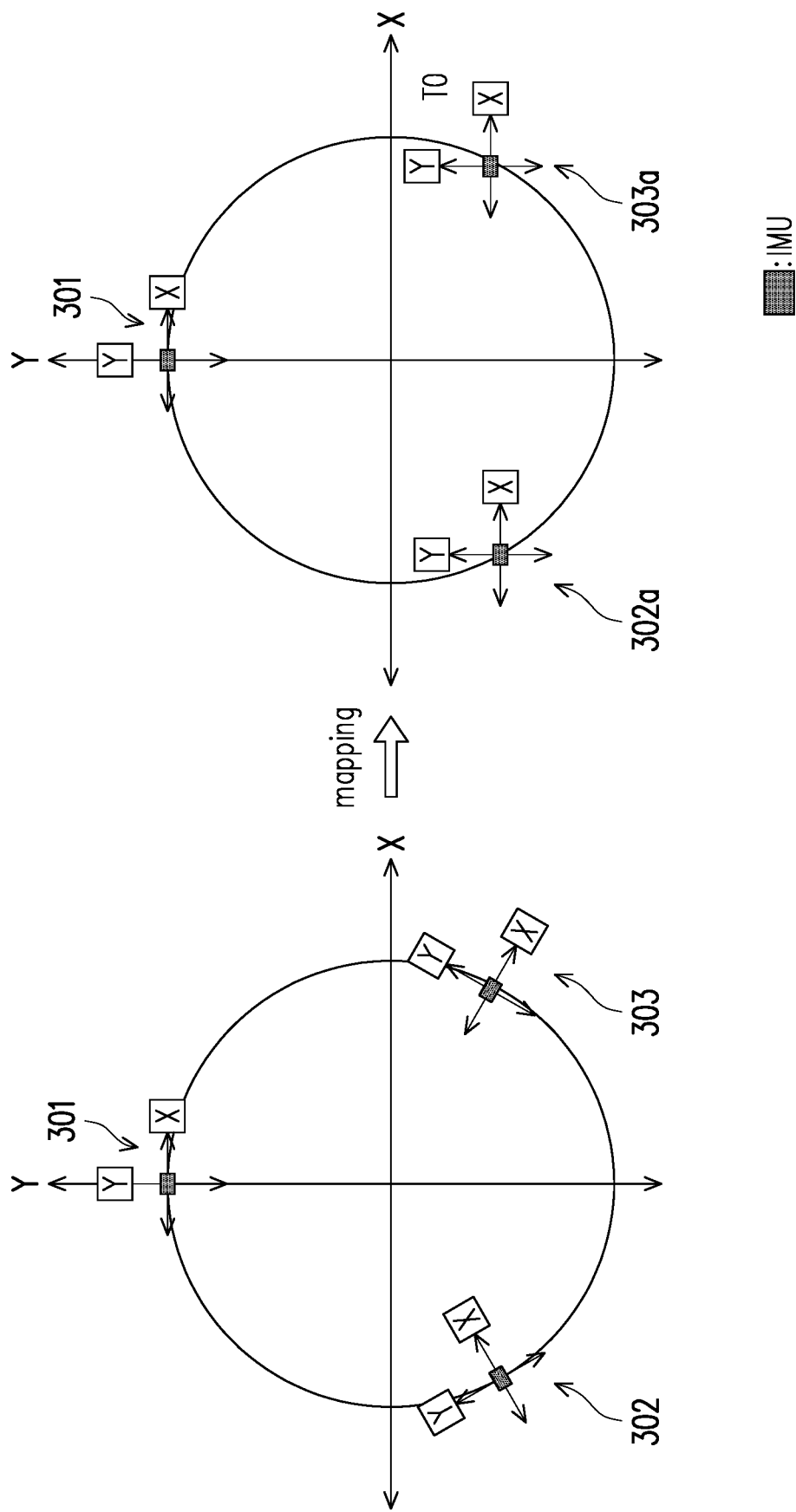
FIG. 3 shows a schematic diagram showing mapping the coordinate systems of the IMUs to the same coordinate system according to an embodiment of the disclosure.

See FIG. 3, which shows a schematic diagram showing mapping the coordinate systems of the IMUs to the same coordinate system according to an embodiment of the disclosure. In the present embodiment, it is assumed that the coordinate systems 301-303 correspond to the IMUs 102a-102c in FIG. 1B, respectively. As can be seen in the left side of FIG. 3, the coordinate systems 301-303 are not consistent/aligned, and hence the processor 104 can map the coordinate systems 301-303 to the same coordinate system for facilitating the following processing. For example, the processor 104 can use the coordinate system 301 as a reference coordinate system and map the coordinate systems 302 and 303 to the reference coordinate system. The mapped coordinate systems 302 and 303 are shown as the coordinate systems 302a and 303a on the right side of FIG. 3.

After mapping the coordinate systems of the IMUs to the same coordinate systems, the moving parameters (e.g., accelerations, angular rates) provided by each IMU can be used in the following steps.

In step S220, the processor 104 determines a rotating condition of the ring controller 100 based on the moving parameters. In step S230, the processor 104 adjusts a visual content provided in the user interface based on the rotating condition of the ring controller 100.

In the embodiments of the disclosure, the visual content in the user interface can be assumed to be a menu including several options for the user to choose, wherein the user interface may include an indicator indicating one of the options, and the user may move the indicator to the desired option via the ring controller 100. Detailed discussions would be provided in the following.

In different embodiments, steps S220 and S230 may be implemented in different ways, which would be further discussed with a first embodiment and a second embodiment.

Figure 4A:
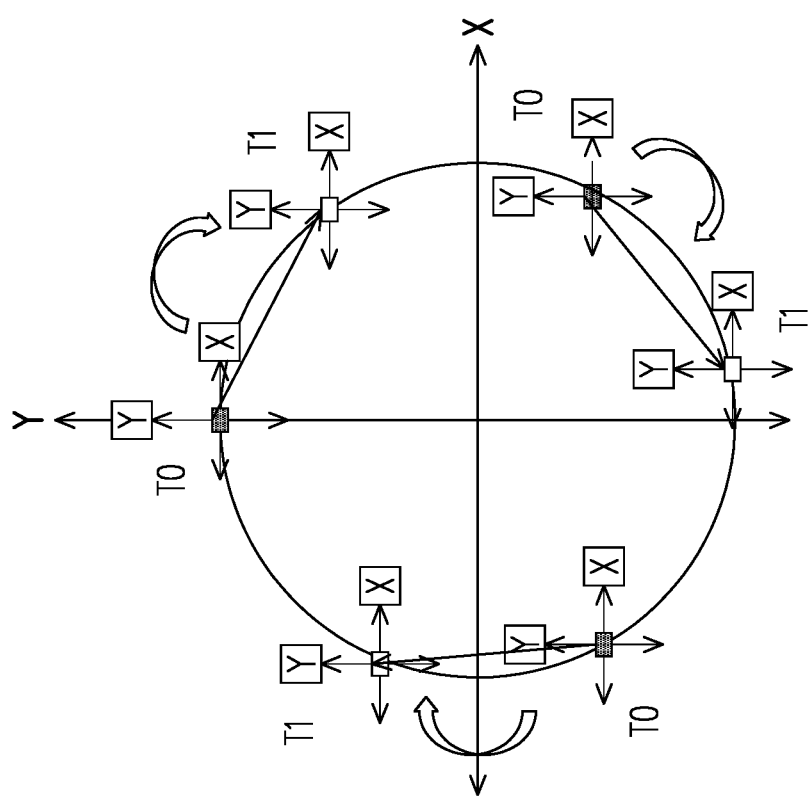
FIG. 4A shows a schematic diagram of the movement of the ring controller according to the first embodiment of the disclosure.

See FIG. 4A, which shows a schematic diagram of the movement of the ring controller according to the first embodiment of the disclosure. In the first embodiment, the rotating condition of the ring controller 100 may be the rotating direction of the ring controller, but the disclosure is not limited thereto.

In FIG. 4A, it is assumed that the positions of the IMUs 102a-102c are the same as shown in FIG. 3 at a timing point T0. Afterwards, the ring controller 100 is rotated in clockwise direction by the user, such the positions of the IMUs 102a-102c are changed to the positions shown in FIG. 4A at a timing point T1.

Figure 4B:
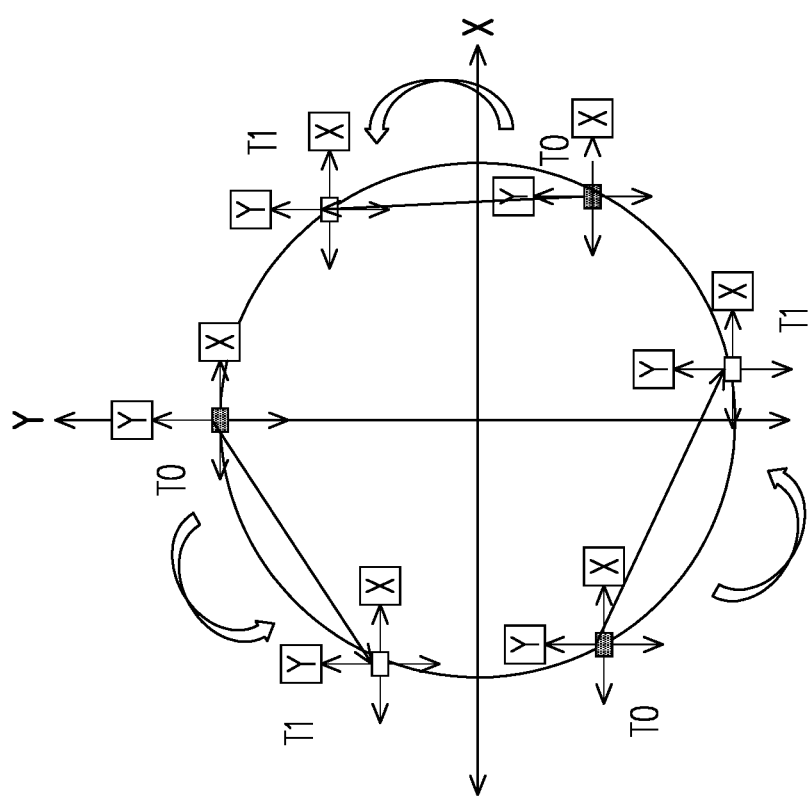
FIG. 4B shows a schematic diagram of the movement of the ring controller according to the first embodiment of the disclosure.

See FIG. 4B, which shows a schematic diagram of the movement of the ring controller according to the first embodiment of the disclosure. In FIG. 4B, it is assumed that the positions of the IMUs 102a-102c are the same as shown in FIG. 3 at the timing point T0. Afterwards, the ring controller 100 is rotated in counter clockwise direction by the user, such the positions of the IMUs 102a-102c are changed to the positions shown in FIG. 4B at the timing point T.

In the case in FIG. 4A or FIG. 4B, each of the IMUs 102a-102c can provide a corresponding multiaxial acceleration vector in response to the movement shown in FIG. 4A. For better understanding, the multiaxial acceleration vector provided by one of the IMUs 102a-102c would be used as an illustrative example.

Figure 4C:
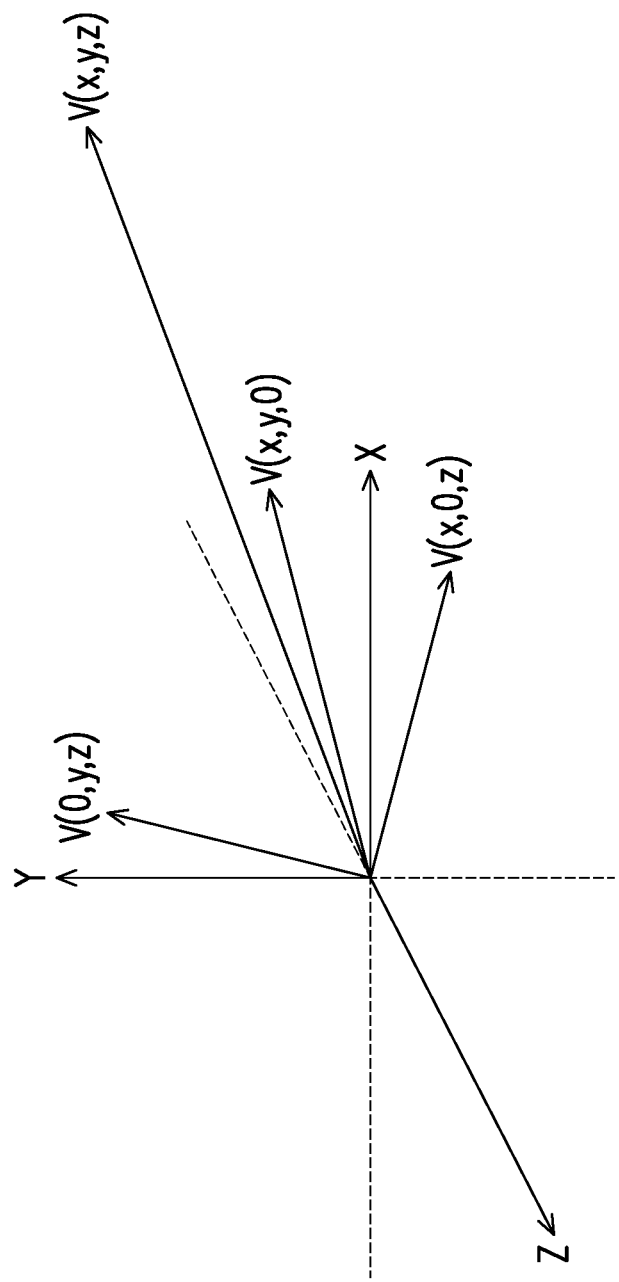
FIG. 4C shows a schematic diagram of determining the rotating condition of the ring controller according to the first embodiment of the disclosure.

See FIG. 4C, which shows a schematic diagram of determining the rotating condition of the ring controller according to the first embodiment of the disclosure. In FIG. 4C, after obtaining the multiaxial acceleration vector (referred to as A(x, y, z)) measured between the timing points T0 and T1, the processor 104 can accordingly obtain a multiaxial speed vector V(x, y, z) corresponding to the multiaxial acceleration vector A(x, y, z). For example, the processor 104 can integrate the multiaxial acceleration vector A(x, y, z) to obtain the multiaxial speed vector V(x, y, z). Next, the processor 104 can obtain a plurality of speed vectors V(0, y, z), V(x, y, 0), and V(x, 0, z) on a plurality of planes via projecting the multiaxial acceleration vector V(x, y, z) onto the planes, respectively.

In one embodiment, the considered planes can be Y-Z plane, X-Y plane and X-Z plane in FIG. 4C. In this case, the processor 104 can perform: projecting the multiaxial speed vector V(x, y, z) onto the Y-Z plane to obtain the speed vector V(0, y, z) (whose x component is 0); projecting the multiaxial speed vector V(x, y, z) onto the X-Y plane to obtain the speed vector V(x, y, 0) (whose z component is 0); projecting the multiaxial speed vector V(x, y, z) onto the X-Z plane to obtain the speed vector V(x, 0, z) (whose y component is 0), but the disclosure is not limited thereto.

In one embodiment, the processor 104 can select a specific speed vector from the speed vectors based on the multiaxial speed vector V(x, y, z). In one embodiment, the processor 104 can obtain a plurality of speed components of the multiaxial speed vector V(x, y, z) on a plurality of axes. In the embodiment, the considered axes can be the X-axis, Y-axis, and Z-axis, and the speed components of the multiaxial speed vector V(x, y, z) can be represented as V(X), V(Y), and V(Z), respectively. Next, the processor 104 can obtain a lowest speed component among the speed components V(X), V(Y), V(Z) of the multiaxial speed vector V(x, y, z), wherein the lowest speed component corresponds to a specific axis of the axes. Next, the processor 104 selects the specific speed vector based on the specific axis, wherein a specific component of the specific speed vector on the specific axis is 0.

For better understanding, the speed component V(Z) would be assumed to be the lowest speed component among the speed components V(X), V(Y), V(Z), but the disclosure is not limited thereto. In this case, the Z-axis corresponding to the speed component V(Z) would be regarded as the specific axis. Therefore, the processor 104 can select the speed vector V(x, y, 0) as the specific speed vector since the z component of the speed vector V(x, y, 0) is 0, but the disclosure is not limited thereto.

Afterwards, the processor 104 can determine the rotating direction of the ring controller 100 based on the specific speed vector (i.e., the speed vector V(x, y, 0)).

In the first embodiment, during determining the rotating direction of the ring controller 100, the processor 104 can obtain a first speed component and a second speed component of the specific speed vector. Next, the processor 104 can determine whether the signs of the first speed component and the second speed component of the specific speed vector are the same. In one embodiment, in response to determining that the signs of the first speed component and the second speed component of the specific speed vector are the same, the processor 104 can determine that the rotating direction of the ring controller is a first rotating direction. On the other hand, in response to determining that the signs of the first speed component and the second speed component of the specific speed vector are different, the processor 104 can determine that the rotating direction of the ring controller is a second rotating direction, wherein the first rotating direction is opposite to the second rotating direction.

For example, if the speed vector V(x, y, 0) is determined to be the specific speed vector, the processor 104 can obtain the speed components V(X), V(Y) of the speed vector V(x, y, 0) as the first speed component and the second speed, respectively. Next, the processor 104 can determine whether the signs of the speed components V(X), V(Y) are the same. If yes, the processor 104 can determine that the rotating direction of the ring controller is the first rotating direction (e.g., a counter clockwise direction); if not, the processor 104 can determine that the rotating direction of the ring controller is the second rotating direction (e.g., a clockwise direction), but the disclosure is not limited thereto.

The relationship between the combination of the signs of the first speed component and the second speed component and the corresponding rotating direction can be provided in the following Table 1.

TABLE 1

|  | first speed component(+) | first speed component(−) |
|---|---|---|
| second speed component(+) | first rotating direction | second rotating direction |
| second speed component(−) | second rotating direction | first rotating direction |

After determining the rotating direction of the ring controller 100, the processor 104 can adjust the visual content provided in the user interface accordingly. In one embodiment, the processor 104 can obtain a first displacement component and a second displacement component based on the first speed component and the second speed component of the specific speed vector. For example, the processor 104 can integrate the speed component V(X) as the first displacement component (referred to as D(X)) corresponding to the first speed component and integrate the speed component V(Y) as the second displacement component (referred to as D(Y)) corresponding to the second speed component.

Next, the processor 104 can modify the first displacement component D(X) and the second displacement component D(Y) as a first moving distance (referred to as d(X)) and a second moving distance (referred to as d(Y)) based on a first step size P1. In one embodiment, the processor 104 can divide the first displacement component D(X) with the first step size P1 to obtain the first moving distance d(X) and divide the second displacement component D(Y) with the first step size P1 to obtain the second moving distance d(Y), but the disclosure is not limited thereto.

Afterwards, the processor 104 can select a first specific moving distance from the first moving distance d(X) and the second moving distance d(Y) based on a pose of the ring controller 100. In the embodiments of the disclosure, the pose of the ring controller 100 can be determined based on the measurements provided by the gyroscopes, which may be referred to related prior arts.

In one embodiment, in response to determine that the pose of the ring controller 100 indicates that an angle between the body part (e.g., a finger) wearing the ring controller 100 and a horizontal plane is smaller than an angle threshold (e.g., 45 degrees), the processor 104 can select the second moving distance d(Y) as the first specific moving distance. In another embodiment, in response to determine that the pose of the ring controller 100 indicates that the angle between the body part (e.g., a finger) wearing the ring controller 100 and the horizontal plane is not smaller than the angle threshold (e.g., 45 degrees), the processor 104 can select the first moving distance d(X) as the first specific moving distance.

From another perspective, if the processor 104 determines that the finger wearing the ring controller 100 is more horizontal than being vertical, the processor 104 can select the second moving distance d(Y) as the first specific moving distance. On the other hand, if the processor 104 determines that the finger wearing the ring controller 100 is more vertical than being horizontal, the processor 104 can select the first moving distance d(X) as the first specific moving distance, but the disclosure is not limited thereto.

Figure 5B:
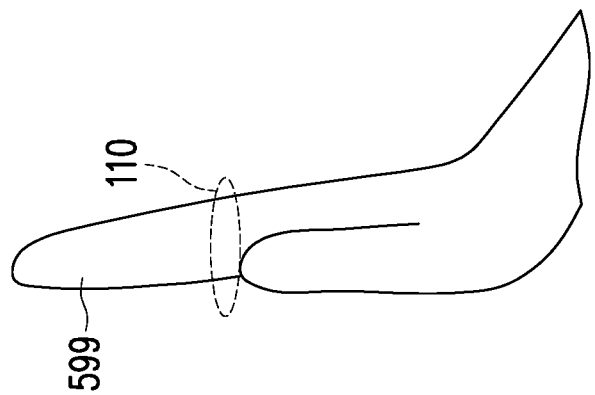
FIG. 5B shows a schematic diagram of the finger being vertical according to an embodiment of the disclosure.
Figure 5A:
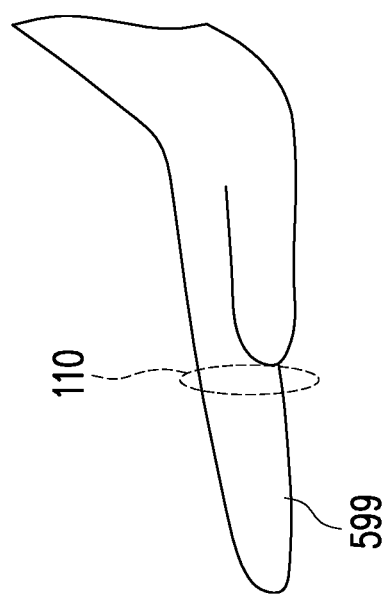
FIG. 5A shows a schematic diagram of the finger being horizontal according to an embodiment of the disclosure.

See FIG. 5A, which shows a schematic diagram of the finger being horizontal according to an embodiment of the disclosure. In FIG. 5A, the pose of the ring controller 100 may indicate that the finger 599 wearing the ring controller 100 is more horizontal. In this case, the processor 104 can select the second moving distance d(Y) as the first specific moving distance. In this case, the user can move the indicator in the user interface vertically among the options, but the disclosure is not limited thereto.

In FIG. 5A, if the rotating direction of the ring controller 100 is determined to be the first rotating direction (e.g., counter clockwise direction), the processor 104 can use a first predetermined direction (e.g., upward direction) as the first specific direction. In another embodiment, if the rotating direction of the ring controller 100 is determined to be the second rotating direction (e.g., clockwise direction), the processor 104 can use a second predetermined direction (e.g., downward direction) as the first specific direction, but the disclosure is not limited thereto.

In FIG. 5A, the first specific moving distance can be implemented as the number of the steps of vertically moving the indicator on the options. In this case, the first step size P1 can be understood as being used for converting the corresponding displacement into the corresponding number of the steps of vertically moving the indicator.

For example, if the first specific moving distance is determined to be 1 step and the first specific direction is determined to be the upward direction, the processor 104 can move the indicator upward by 1 step to indicate another option, which is 1 step above the option originally indicated by the indicator. For another example, if the first specific moving distance is determined to be 2 steps and the first specific direction is determined to be the downward direction, the processor 104 can move the indicator downward by 2 steps to indicate another option, which is 2 steps below the option originally indicated by the indicator.

See FIG. 5B, which shows a schematic diagram of the finger being vertical according to an embodiment of the disclosure. In FIG. 5B, the pose of the ring controller 100 may indicate that the finger 599 wearing the ring controller 100 is more vertical. In this case, the processor 104 can select the first moving distance d(X) as the first specific moving distance. In this case, the user can move the indicator in the user interface horizontally among the options, but the disclosure is not limited thereto.

In FIG. 5B, if the rotating direction of the ring controller 100 is determined to be the first rotating direction (e.g., counter clockwise direction), the processor 104 can use a third predetermined direction (e.g., rightward direction) as the first specific direction. In another embodiment, if the rotating direction of the ring controller 100 is determined to be the second rotating direction (e.g., clockwise direction), the processor 104 can use a fourth predetermined direction (e.g., leftward direction) as the first specific direction, but the disclosure is not limited thereto.

In FIG. 5B, the first specific moving distance can be implemented as the number of the steps of horizontally moving the indicator on the options. In this case, the first step size P1 can be understood as being used for converting the corresponding displacement into the corresponding number of the steps of horizontally moving the indicator.

For example, if the specific moving distance is determined to be 1 step and the first specific direction is determined to be the leftward direction, the processor 104 can move the indicator leftward by 1 step to indicate another option, which is the left option of the option originally indicated by the indicator. For another example, if the specific moving distance is determined to be 1 step and the first specific direction is determined to be the rightward direction, the processor 104 can move the indicator rightward by 1 step to indicate another option, which is the right option of the option originally indicated by the indicator.

Figure 6:
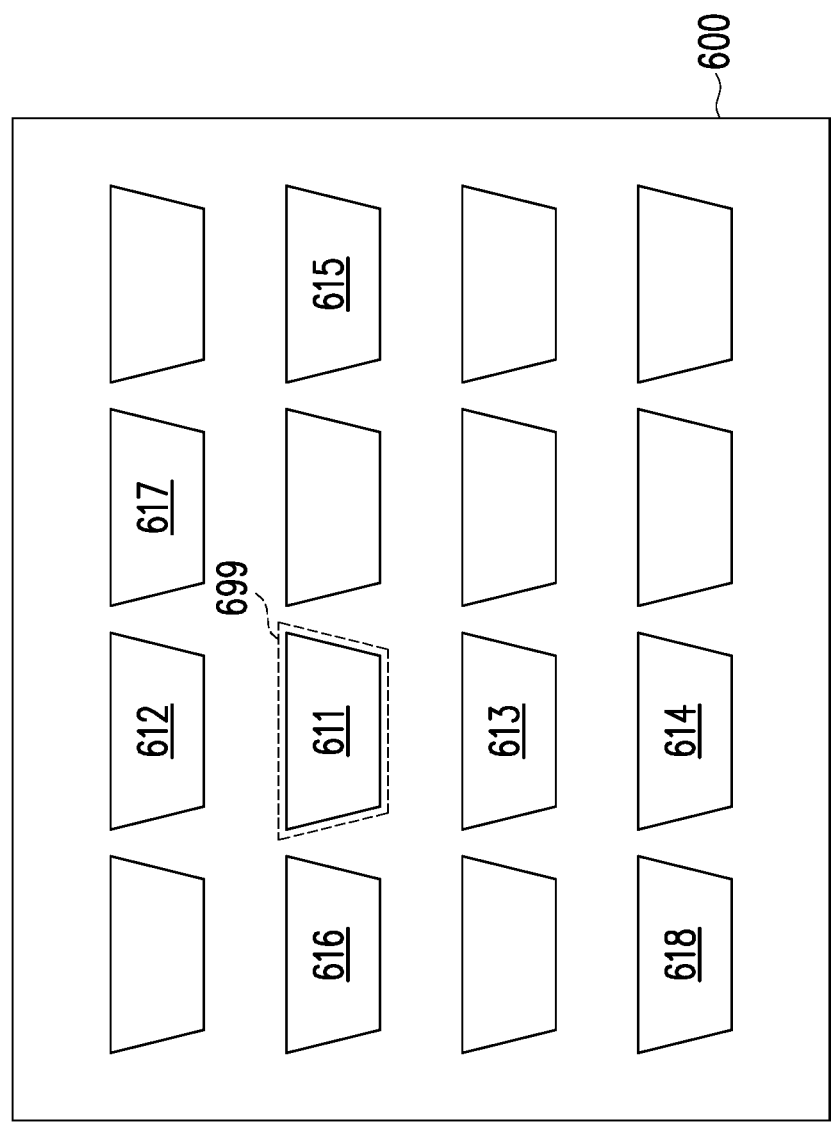
FIG. 6 shows a schematic diagram of the user interface according to the first embodiment of the disclosure.

See FIG. 6, which shows a schematic diagram of the user interface according to the first embodiment of the disclosure. In FIG. 6, the user interface 600 includes an indicator 699 and several options, such as options 611-618, wherein the indicator 699 is assumed to indicate the option 611. In this case, if the first specific moving distance is determined to be 1 step and the first specific direction is determined to be the upward direction, the processor 104 can move the indicator 699 upward by 1 step to indicate the option 612, which is 1 step above the option 611 originally indicated by the indicator 699.

For another example, if the first specific moving distance is determined to be 2 steps and the first specific direction is determined to be the downward direction, the processor 104 can move the indicator 699 downward by 2 steps to indicate the option 614, which is 2 steps below the option 611 originally indicated by the indicator 699.

In addition, if the first specific moving distance is determined to be 2 steps and the first specific direction is determined to be the rightward direction, the processor 104 can move the indicator 699 rightward by 2 steps to indicate the option 615. Further, if the first specific moving distance is determined to be 1 step and the first specific direction is determined to be the leftward direction, the processor 104 can move the indicator 699 leftward by 1 step to indicate the option 616.

Therefore, the user can move the indicator 699 vertically among the options by rotating the ring controller 100 when the pose of the ring controller 100 indicates that the finger wearing the ring controller 100 is more horizontal. In addition, the user can move the indicator 699 horizontally among the options by rotating the ring controller 100 when the pose of the ring controller 100 indicates that the finger wearing the ring controller 100 is more vertical, but the disclosure is not limited thereto.

In the second embodiment, the considered rotating condition of the ring controller 100 can be the angular rates corresponding to the movement of the ring controller, and the processor 104 can accordingly adjust the visual content in the user interface as well. Detailed discussions would be provided in the following.

In the second embodiment, the processor 104 can obtain a first angular rate and a second angular rate based on the acceleration components (referred to as A(X), A(Y), and A(Z)) of the multiaxial acceleration vector A(x, y, z). In one embodiment, the first angular rate can be the angular rate on the pitch-axis, and the second angular rate can be the angular rate on the roll-axis. Specifically, even though the gyroscopes in the IMUs can provide a set of angular rates on the pitch-axis, roll-axis, and yaw-axis, the angular rates on the pitch-axis and the roll-axis may not be precise.

Therefore, the processor 104 can obtain the angular rates on the pitch-axis and the roll-axis based on the acceleration components A(X), A(Y), and A(Z) of the multiaxial acceleration vector A(x, y, z). In one embodiment, the processor 104 can obtain the first angular rate (i.e., the angular rate on the pitch-axis) as $$\text{``}180 \times \tan^{-1}\left(\frac{A(X)}{\sqrt{A(Y)^2 + A(Z)^2}}\right)/\pi\text{''},$$

$$\text{and as ``}180 \times \tan^{-1}\left(\frac{A(Y)}{\sqrt{A(X)^2 + A(Z)^2}}\right)/\pi\text{''},$$

the processor 104 can obtain the second angular rate (i.e., the angular rate on the roll-axis) but the disclosure is not limited thereto.

Next, the processor 104 can modify the first angular rate and the second angular rate as a third moving distance and a fourth moving distance based on a second step size P2, respectively. In one embodiment, the processor 104 can divide the first angular rate with the second step size P2 to obtain the third moving distance and divide the second angular rate with the second step size P2 to obtain the fourth moving distance, but the disclosure is not limited thereto.

Afterwards, the processor 104 selects a second specific moving distance from the third moving distance and the fourth moving distance based on the pose of the ring controller 100. In addition, the processor 104 selects a specific angular rate from the first angular rate and the second angular rate based on the pose of the ring controller 100.

In one embodiment, in response to determine that the pose of the ring controller 100 indicates that the angle between the body part (e.g., a finger) wearing the ring controller 100 and the horizontal plane is smaller than the angle threshold (e.g., 45 degrees), the processor 104 can select the third moving distance as the second specific moving distance. In addition, the processor 104 can select the first angular rate corresponding to the third moving distance as the specific angular rate.

In another embodiment, in response to determine that the pose of the ring controller 100 indicates that the angle between the body part (e.g., a finger) wearing the ring controller 100 and the horizontal plane is not smaller than the angle threshold (e.g., 45 degrees), the processor 104 can select the fourth moving distance as the second specific moving distance. In addition, the processor 104 can select the second angular rate corresponding to the fourth moving distance as the specific angular rate.

From another perspective, if the processor 104 determines that the finger wearing the ring controller 100 is more horizontal than being vertical, the processor 104 can select the third moving distance (which corresponds to the first angular rate on the pitch-axis) as the second specific moving distance and select the first angular rate as the specific angular rate. On the other hand, if the processor 104 determines that the finger wearing the ring controller 100 is more vertical than being horizontal, the processor 104 can select the fourth moving distance (which corresponds to the second angular rate on the roll-axis) as the second specific moving distance and select the second angular rate as the specific angular rate, but the disclosure is not limited thereto.

After determining the second specific moving distance and the specific angular rate, the processor 104 can move the indicator along a second specific direction corresponding to the specific angular rate of the ring controller by the second specific moving distance.

Referring back to FIG. 5A, the pose of the ring controller 100 may indicate that the finger 599 wearing the ring controller 100 is more horizontal. In this case, the processor 104 can select the third moving distance as the second specific moving distance and select the first angular rate as the specific angular rate. In this case, the user can move the indicator in the user interface horizontally among the options, but the disclosure is not limited thereto.

In FIG. 5A, if the specific angular rate is determined to be with a first sign (e.g., a positive sign), the processor 104 can use the third predetermined direction (e.g., rightward direction) as the second specific direction. In another embodiment, if the specific angular rate is determined to be with a second sign (e.g., a negative sign), the processor 104 can use the fourth predetermined direction (e.g., leftward direction) as the second specific direction, but the disclosure is not limited thereto.

In FIG. 5A, the second specific moving distance can be implemented as the number of the steps of horizontally moving the indicator on the options. In this case, the second step size P2 can be understood as being used for converting the corresponding displacement into the corresponding number of the steps of horizontally moving the indicator.

For example, if the second specific moving distance is determined to be 1 step and the second specific direction is determined to be the rightward direction, the processor 104 can move the indicator rightward by 1 step to indicate another option, which is the right option of the option originally indicated by the indicator. For another example, if the second specific moving distance is determined to be 1 step and the second specific direction is determined to be the leftward direction, the processor 104 can move the indicator leftward by 1 step to indicate another option, which is the left option of the option originally indicated by the indicator.

Referring back to FIG. 5B, the pose of the ring controller 100 may indicate that the finger 599 wearing the ring controller 100 is more vertical. In this case, the processor 104 can select the fourth moving distance as the second specific moving distance and select the second angular rate as the specific angular rate. In this case, the user can move the indicator in the user interface vertically among the options, but the disclosure is not limited thereto.

In FIG. 5B, if the specific angular rate is determined to be with a first sign (e.g., a positive sign), the processor 104 can use the first predetermined direction (e.g., upward direction) as the second specific direction. In another embodiment, if the specific angular rate is determined to be with a second sign (e.g., a negative sign), the processor 104 can use the second predetermined direction (e.g., downward direction) as the second specific direction, but the disclosure is not limited thereto.

In FIG. 5B, the second specific moving distance can be implemented as the number of the steps of vertically moving the indicator on the options. In this case, the second step size P2 can be understood as being used for converting the corresponding displacement into the corresponding number of the steps of vertically moving the indicator.

For example, if the second specific moving distance is determined to be 1 step and the second specific direction is determined to be the upward direction, the processor 104 can move the indicator rightward by 1 step to indicate another option, which is 1 step above the option originally indicated by the indicator. For another example, if the second specific moving distance is determined to be 2 steps and the second specific direction is determined to be the downward direction, the processor 104 can move the indicator downward by 2 steps to indicate another option, which is 2 steps below the option originally indicated by the indicator.

Referring back to FIG. 6, if the second specific moving distance is determined to be 2 steps and the second specific direction is determined to be the rightward direction, the processor 104 can move the indicator 699 rightward by 2 steps to indicate the option 615.

For another example, if the second specific moving distance is determined to be 1 step and the second specific direction is determined to be the leftward direction, the processor 104 can move the indicator 699 leftward by 1 step to indicate the option 616.

In addition, if the second specific moving distance is determined to be 1 step and the second specific direction is determined to be the upward direction, the processor 104 can move the indicator 699 upward by 1 step to indicate the option 612. Further, if the second specific moving distance is determined to be 2 steps and the second specific direction is determined to be the downward direction, the processor 104 can move the indicator 699 downward by 2 steps to indicate the option 614.

Therefore, the user can move the indicator 699 horizontally among the options by horizontally pushing the ring controller 100 when the pose of the ring controller 100 indicates that the finger wearing the ring controller 100 is more horizontal. In addition, the user can move the indicator 699 vertically among the options by vertically pushing the ring controller 100 when the pose of the ring controller 100 indicates that the finger wearing the ring controller 100 is more vertical, but the disclosure is not limited thereto.

In a third embodiment, the first embodiment and the second embodiment can be combined to collectively determine the movement of the indicator in the user interface. For example, the processor 104 may determine the first/second specific moving distance and the first/second specific direction based on the moving parameters provided by the motion detector 102 in FIG. 6.

In the embodiment where the pose of the ring controller 100 is similar to the pose shown in FIG. 5A, if the first specific moving distance is determined to be 1 step, the first specific direction is determined to be the upward direction, the second specific moving distance is determined to be 1 step and the second specific direction is determined to be the rightward direction, the processor 104 can move the indicator 699 rightward by 1 step and upward by 1 step to indicate the option 617. In one embodiment, if the first specific moving distance is determined to be 2 steps, the first specific direction is determined to be the downward direction, the second specific moving distance is determined to be 1 step and the second specific direction is determined to be the leftward direction, the processor 104 can move the indicator 699 leftward by 1 step and downward by 2 steps to indicate the option 618, but the disclosure is not limited thereto.

In the embodiment where the pose of the ring controller 100 is similar to the pose shown in FIG. 5B, if the first specific moving distance is determined to be 1 step, the first specific direction is determined to be the rightward direction, the second specific moving distance is determined to be 1 step and the second specific direction is determined to be the upward direction, the processor 104 can move the indicator 699 rightward by 1 step and upward by 1 step to indicate the option 617. In one embodiment, if the first specific moving distance is determined to be 1 step, the first specific direction is determined to be the leftward direction, the second specific moving distance is determined to be 2 steps and the second specific direction is determined to be the downward direction, the processor 104 can move the indicator 699 leftward by 1 step and downward by 2 steps to indicate the option 618, but the disclosure is not limited thereto.

In one embodiment, in response to determining that a touch operation is detected by the ring controller 100, the processor 104 can adjust the visual content provided in the user interface based on the touch operation. For example, if the visual content includes a specific object (e.g., an option) indicated by an indicator controlled by the ring controller 100, the processor 104 can trigger the specific object in response to the touch operation. For example, the processor 104 can activate the option indicated by the indicator, but the disclosure is not limited thereto.

In one embodiment, the ring controller 100 can further include a temperature sensor 106 coupled to the processor 104, and the processor 104 can detect the touch operation based on the measurements provided by the temperature sensor 106. Specifically, the processor 104 can firstly determine a reference temperature of the ring controller 100. In one embodiment, the reference temperature can be the room temperature measured by the temperature sensor.

Next, the processor 104 can control the temperature sensor 106 to detect a current temperature of the ring controller 100, and the processor 104 can determine whether a temperature difference between the reference temperature and the current temperature exceeds a temperature threshold. In one embodiment, the temperature sensor can be disposed at the locations where the user can touch on the ring controller 100. Therefore, when the processor 104 determines that the temperature difference between the reference temperature (e.g., the room temperature) and the current temperature exceeds the temperature threshold, it represents that the user may have touched the temperature sensor. In this case, the processor 104 can determine that the touch operation is detected.

On the other hand, when the processor 104 determines that the temperature difference between the reference temperature (e.g., the room temperature) and the current temperature does not exceed the temperature threshold, it represents that the user does not touch the temperature sensor. In this case, the processor 104 can determine that no touch operation is detected.

The disclosure further provides a computer readable medium for executing the method for detecting the movement of the ring controller. The computer readable medium is composed of a plurality of program instructions (for example, a setting program instruction and a deployment program instruction) embodied therein. These program instructions can be loaded into the ring controller 100 and executed by the same to execute the method for detecting the movement of the ring controller and the functions of the ring controller 100 described above.

In summary, the embodiments of the disclosure can determine the rotating condition of the ring controller and accordingly adjust the visual content in the user interface, such that the user wearing the ring controller can interact with the visual content in a more intuitive way. In addition, the embodiments of the disclosure can detect the touch operation based on the temperature variation detected by the temperature sensor, which provides a novel way for detecting touch operations.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for detecting a movement of a ring controller, adapted to a ring controller, comprising:
    obtaining a plurality of moving parameters of the movement of a whole body of the ring controller, wherein the ring controller is used to interact with a user interface, wherein the moving parameters are provided by at least one inertial measurement unit (IMU) of the ring controller in response to the movement of the whole body of the ring controller;
    determining a rotating condition of the whole body of the ring controller based on the moving parameters, wherein the moving parameters comprise a multiaxial acceleration vector, and the rotating condition comprises a plurality of angular rates, and the step of determining the rotating condition of the ring controller based on the moving parameters comprises:
        obtaining a first angular rate and a second angular rate based on a plurality of acceleration components of the multiaxial acceleration vector; and
    adjusting a visual content provided in the user interface based on the rotating condition of the whole body of the ring controller, wherein the visual content comprises an indicator, and the step of adjusting the visual content provided in the user interface based on the rotating condition of the ring controller comprises:
        modifying the first angular rate and the second angular rate as a third moving distance and a fourth moving distance based on a second step size;
        selecting a second specific moving distance from the third moving distance and the fourth moving distance based on a pose of the ring controller;
        selecting a specific angular rate from the first angular rate and the second angular rate based on the pose of the ring controller;
        moving the indicator along a second specific direction corresponding to the specific angular rate of the ring controller by the second specific moving distance.

2. The method according to claim 1, wherein the moving parameters comprise a multiaxial acceleration vector, the rotating condition comprises a rotating direction of the ring controller, and the step of determining the rotating condition of the ring controller based on the moving parameters comprises:
obtaining a multiaxial speed vector corresponding to the multiaxial acceleration vector;
obtaining a plurality of speed vectors on a plurality of planes via projecting the multiaxial acceleration vector onto the planes, respectively;
selecting a specific speed vector from the speed vectors based on the multiaxial speed vector;
determining the rotating direction of the ring controller based on the specific speed vector.

3. The method according to claim 2, wherein the step of selecting the specific speed vector from the speed vectors based on the multiaxial speed vector comprises:
obtaining a plurality of speed components of the multiaxial speed vector on a plurality of axes;
obtaining a lowest speed component among the speed components of the multiaxial speed vector, wherein the lowest speed component corresponds to a specific axis of the axes;
selecting the specific speed vector based on the specific axis, wherein a specific component of the specific speed vector on the specific axis is 0.

4. The method according to claim 1, further comprising:
in response to determining that a touch operation is detected by the ring controller, adjusting the visual content provided in the user interface based on the touch operation.

5. The method according to claim 4, further comprising:
determining a reference temperature of the ring controller;
detecting a current temperature of the ring controller;
in response to determining that a temperature difference between the reference temperature and the current temperature exceeds a temperature threshold, determining that the touch operation is detected.

6. The method according to claim 4, wherein the visual content comprises a specific object indicated by an indicator controlled by the ring controller, and the step of adjusting the visual content provided in the user interface based on the touch operation comprises triggering the specific object in response to the touch operation.

7. A ring controller, comprising:
a motion detector, obtaining a plurality of moving parameters of a movement of a whole body of the ring controller, wherein the ring controller is used to interact with a user interface, wherein the moving parameters are provided by at least one inertial measurement unit (IMU) of the ring controller in response to the movement of the whole body of the ring controller;
a processor, coupled to the motion detector and performs:
determining a rotating condition of the whole body of the ring controller based on the moving parameters, wherein the moving parameters comprise a multiaxial acceleration vector, and the rotating condition comprises a plurality of angular rates, and determining the rotating condition of the ring controller based on the moving parameters comprises:
obtaining a first angular rate and a second angular rate based on a plurality of acceleration components of the multiaxial acceleration vector; and
adjusting a visual content provided in the user interface based on the rotating condition of the whole body of the ring controller, wherein the visual content comprises an indicator, and adjusting the visual content provided in the user interface based on the rotating condition of the ring controller comprises:
modifying the first angular rate and the second angular rate as a third moving distance and a fourth moving distance based on a second step size;
selecting a second specific moving distance from the third moving distance and the fourth moving distance based on a pose of the ring controller;
selecting a specific angular rate from the first angular rate and the second angular rate based on the pose of the ring controller;
moving the indicator along a second specific direction corresponding to the specific angular rate of the ring controller by the second specific moving distance.

8. The ring controller according to claim 7, wherein the moving parameters comprise a multiaxial acceleration vector, the rotating condition comprises a rotating direction of the ring controller, and the processor performs:
obtaining a multiaxial speed vector corresponding to the multiaxial acceleration vector;
obtaining a plurality of speed vectors on a plurality of planes via projecting the multiaxial acceleration vector onto the planes, respectively;
selecting a specific speed vector from the speed vectors based on the multiaxial speed vector;
determining the rotating direction of the ring controller based on the specific speed vector.

9. The ring controller according to claim 8, wherein the processor performs:
obtaining a plurality of speed components of the multiaxial speed vector on a plurality of axes;
obtaining a lowest speed component among the speed components of the multiaxial speed vector, wherein the lowest speed component corresponds to a specific axis of the axes;
selecting the specific speed vector based on the specific axis, wherein a specific component of the specific speed vector on the specific axis is 0.

10. The ring controller according to claim 7, wherein the processor further performs:
in response to determining that a touch operation is detected by the ring controller, adjusting the visual content provided in the user interface based on the touch operation.

11. The ring controller according to claim 10, wherein the processor further performs:
determining a reference temperature of the ring controller;
detecting a current temperature of the ring controller;
in response to determining that a temperature difference between the reference temperature and the current temperature exceeds a temperature threshold, determining that the touch operation is detected.

12. A non-transitory computer readable medium, the computer readable medium recording an executable computer program, the executable computer program being loaded by a ring controller to perform steps of:
obtaining a plurality of moving parameters of the movement of a whole body of the ring controller, wherein the ring controller is used to interact with a user interface, wherein the moving parameters are provided by at least one inertial measurement unit (IMU) of the ring controller in response to the movement of the whole body of the ring controller;
determining a rotating condition of the whole body of the ring controller based on the moving parameters, wherein the moving parameters comprise a multiaxial acceleration vector, and the rotating condition comprises a plurality of angular rates, and the step of determining the rotating condition of the ring controller based on the moving parameters comprises:
  obtaining a first angular rate and a second angular rate based on a plurality of acceleration components of the multiaxial acceleration vector; and
adjusting a visual content provided in the user interface based on the rotating condition of the whole body of the ring controller, wherein the visual content comprises an indicator, and the step of adjusting the visual content provided in the user interface based on the rotating condition of the ring controller comprises:
  modifying the first angular rate and the second angular rate as a third moving distance and a fourth moving distance based on a second step size;
  selecting a second specific moving distance from the third moving distance and the fourth moving distance based on a pose of the ring controller;
  selecting a specific angular rate from the first angular rate and the second angular rate based on the pose of the ring controller;
  moving the indicator along a second specific direction corresponding to the specific angular rate of the ring controller by the second specific moving distance.

* * * * *